US006568435B2

United States Patent
Jaeger

(10) Patent No.: US 6,568,435 B2
(45) Date of Patent: May 27, 2003

(54) VENTILATION OF A CLOSED SPACE OR CLOSED CONTAINERS WITH ONLY ONE VENTHOLE AND FILLED WITH SOLIDS

(75) Inventor: Marc J. Jaeger, 5915 SW. 36 Way, Gainesville, FL (US) 32608

(73) Assignee: Marc J. Jaeger, Gainesville, FL (US)

( * ) Notice: Subject to any disclaimer, the term of this patent is extended or adjusted under 35 U.S.C. 154(b) by 182 days.

(21) Appl. No.: 09/755,295

(22) Filed: Jan. 5, 2001

(65) Prior Publication Data

US 2002/0088503 A1 Jul. 11, 2002

(51) Int. Cl.[7] .............................. B65B 31/00
(52) U.S. Cl. ............................ 141/64; 141/63; 141/67; 141/100
(58) Field of Search ......................... 141/64, 63, 67, 141/70, 48, 9, 100, 105; 222/152; 405/128.45, 128.2, 128.25

(56) References Cited

U.S. PATENT DOCUMENTS

| 1,406,380 A | * | 2/1922 | Heath et al. | |
| 2,855,006 A | * | 10/1958 | Geisler | |
| 4,848,387 A | * | 7/1989 | Hon | |
| 5,069,020 A | * | 12/1991 | Sanfilippo et al. | 141/63 |
| 5,288,169 A | * | 2/1994 | Neeper | 405/128.45 |
| 5,403,119 A | * | 4/1995 | Hoyle | 405/128.2 |
| 5,673,752 A | * | 10/1997 | Scudder et al. | 166/230 |
| 5,806,574 A | * | 9/1998 | Yamashita et al. | 141/48 |
| 6,158,924 A | * | 12/2000 | Athens et al. | 166/268 |
| 6,254,311 B1 | * | 7/2001 | Manchester | 166/370 |

FOREIGN PATENT DOCUMENTS

JP 58196396 * 11/1983

* cited by examiner

Primary Examiner—Gregory L. Huson
Assistant Examiner—Khoa Huynh

(57) ABSTRACT

A system and method that removes an unwanted gas or unwanted gases or volatile liquids from containers or spaces that have only one venthole. The unwanted gases are replaced by a desirable, usually inert gas. The containers may be filled with granular solids of any size or shape; the containers may be of any size or geometry. The method consists of a pump system that applies small pressure oscillations to the single vent hole. These oscillations compress and expand the gas in the container. The resulting gas displacements in the container generate vortices in the gas spaces between the granular solids which mix the gases, replacing the unwanted resident gas by a desirable gas. The theory is related to the dispersion in porous media. Experiments are presented that document the time needed for the washout of the unwanted resident gas.

1 Claim, 2 Drawing Sheets

VENTILATION OF A CLOSED SPACE OR CLOSED CONTAINERS WITH ONLY ONE VENTHOLE AND FILLED WITH SOLIDS

FIELD OF INVENTION

The field is ventilation, i.e., the art of removal or renewal of gas in a closed space, room, or container. The invention offers a method to ventilate a space, room, or container that has only one opening or venthole and can, therefore, not be flushed. The method may be used even if the space is filled with solids such as granular material.

DESCRIPTION OF PRIOR ART

The invention is based on two prior U.S. Pat. Nos. 4,770,675; 5,288,169 and on a number of publications listed above.

These patents and papers describe a method by which the diffusional mass transport of a tracer substance within a carrier fluid is enhanced by several orders. The method was first presented by Taylor (1953) for the mass transport of a tracer in steadily moving fluid. More recently, the phenomenon was applied to oscillatory flow in pipes (Harris and Goren, 1967; Watson, 1983; Jaeger and Kurzweg, 1983). The theory was substantiated by experiments (Joshi C H, Kamm R D, Drazen J M and Slutszky A S, 1983). The mass transport maintains its diffusional character which has led to its application to separating gases or solutes. Optimal conditions may be achieved that give maximal mass transport and maximal separation (Kurzweg U H and Jaeger M J, 1986, Jaeger M J, 1998).

The mechanism responsible for this enhanced transport is due to the interaction of two well known fundamental physical properties. The first is related to fluid viscosity: when fluid flows steadily in a pipes the fluid near the pipe wall is slowed down while the fluid in the pipe's centerline is accelerated. The second is molecular diffusion: molecules move from an area of high concentration to an area of low concentration due to random thermal motions. The property of molecular diffusion is maintained when the fluid is flowing which allows the two mechanisms to interact. Thus, molecules located in the fast flowing center region may diffuse radially toward the sluggish boundary layer and molecules from the motionless boundary layer may diffuse into the fast streaming center region. In oscillatory flow the process becomes rather complex, with radial motions toward the centerline and away from the centerline occurring alternatively. The process depends on pipe radius, oscillation frequency, and physical properties of the carrier and of the tracer molecules. It results in greatly increased mass transport down a concentration gradient as shown by Watson, 1983, Jaeger and Kurzweg, 1983 and Kurzweg and Jaeger, 1986. An interesting property of the process is that it maintains its diffusional character, i.e. molecules of different size move at different speeds U.S. Pat. No. 4,770,675; Jaeger M J, 1998).

The dispersion process is also observed in porous media where it has been studied extensively for its industrial applications using packed columns. A summary of the extensive work is found in monographs by Leva (1959) and Bear (1972). The mechanism in those media is typically different from that in tubes. Convective mixing of parallel rivulets becomes increasingly important. The process is not accessible to a rigorous analytical solution. Approximations have been published and summarized by Bear (1972). Recent work by Hall (1995) indicates that these early studies, done on steady laminar, porous flow, are valid as well in oscillatory, porous flow.

The present invention is based on above processes. In addition, it makes use of a third fundamental property, namely gas compressibility. The invention is therefore only applicable to gases. To our knowledge the adding and withdrawing repeatedly volumes of gas with the intention of ventilating a gaseous space has been used only once before, namely by Neeper in his 1994 U.S. Patent. The invention describes the pumping and withdrawing of volumes of air into the ground for the purpose of purging the ground of volatile contaminants such as gasoline. The present invention differs from Neeper's by its geometry and by its applications, yet is based on the same principles.

DESCRIPTION OF THE INVENTION (FIG. 1)

Figure 1:
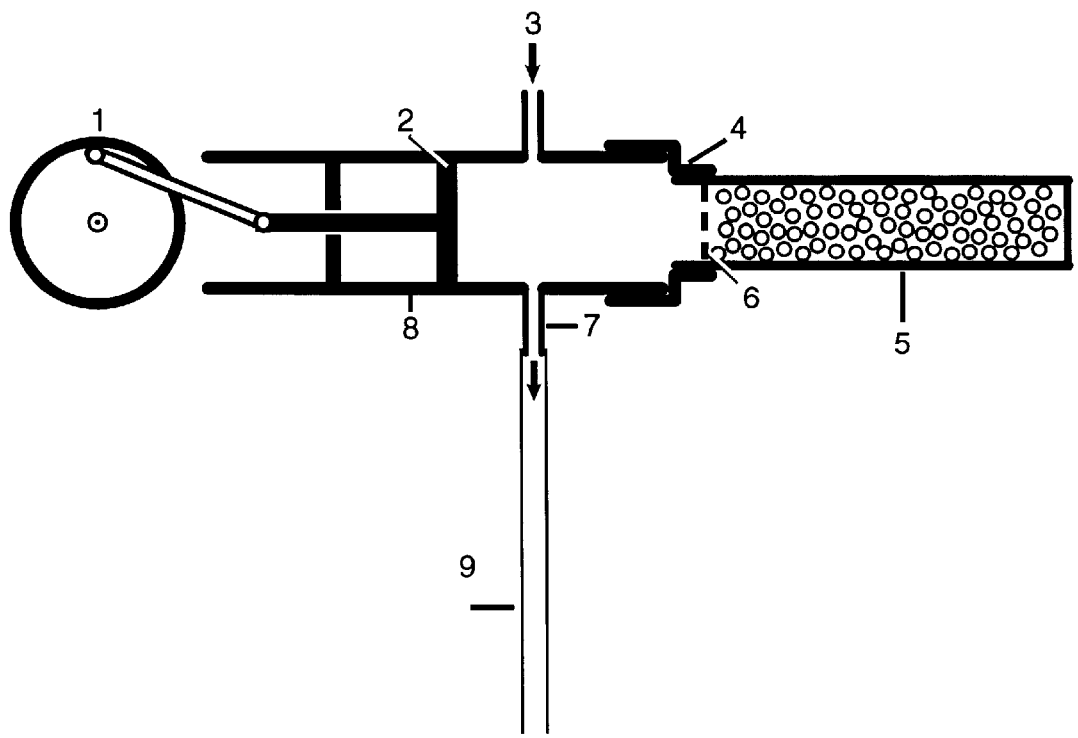
FIG. 1 shows a detailed embodiment of the reciprocating pump assembly.

The invention consists of a reciprocating pump made up of a cylinder (8), a piston (2), a motor (not shown) and a drive (1); FIG. 1. Said pump is connected to a bead-filled container (5) through an adapter (4). The adapter has an inflow port (3) and an outflow port (7). It is flushed or perfused by desirable gas that enters into the adapter through inflow port (3) and exits through outflow port (7). The bead-filled container may be of any size, shape, or geometry. The adapter (4) is engineered in such a way as to connect the pump and the container in an airtight fashion. A screen (6) separates the pump assembly from the container; it keeps the beads and other solids filling the container in place.

When the motor is activated, the piston (2) moves in a reciprocating fashion, thereby forcing repeatedly volumes of desirable gas into the container (5) and withdrawing repeatedly and in quick succession volumes of a mixture of desirable gas and unwanted gas from the container. The said mixture of desirable gas and unwanted gas that is withdrawn from the container is diluted in the pump assembly with the continuously inflowing desirable gas and expelled through port (7).

In simple terms, desirable gas is pushed with each stroke into the container where it mixes with the resident unwanted gas. The mixing is promoted by the presence of the packed solids such as beads or granules which generate a complex type of flow known as porous flow (Bear 1972). The mixing process moves deeper and deeper into the container with each stroke; simultaneously, a mixture of unwanted gas and desirable gas is moved with each stroke into the pump assembly where it mixes with the flushing desirable gas and is expelled until all the unwanted gas is removed.

DETAILED DESCRIPTION OF THE INVENTION

The following is required for optimal function of the invention:

The adapter is to be engineered so as to provide an air-tight connection between the pump assembly and the container (5). The pump has no valves. Its stroke volume is approximately 20% of the void space of the container in our series, but it may be much larger if one wishes a rapid washout. If the container is filled with granular solids, the void space is estimated using a nomogram provided by Leva, 1959, p. 54.

The reciprocating action of piston (2) results in pressure swings in the pump assembly and in the container. In our system, the amplitude of these oscillations were very close to identical throughout the container, i.e., the amplitude was the same at the closed end of the container and in the adapter. The gas in both pump assembly and container is compressed and expanded; this compression and expansion results in changes of volume of the gas displaced. Thus, e.g., the volume of gas entering and leaving the container with each stroke is smaller than the stroke volume of the piston (Jaeger, 1964).

The outflow port (7) is connected to a long, fairly narrow pipe (9); we used a 23 foot, ½" ID plastic hose. This long tube has a high impedance to oscillatory flow, but a low resistance to steady flow. It prevents ambient air to be aspirated into the pump assembly when the motion of the piston results in the pressure in the cylinder to be lower than atmospheric.

Experimental Evidence

The pump assembly consisted of a linear motor driven by an amplifier and a sine wave generator. Its stroke volume and frequency were adjustable. The pump assembly's volume was one liter. The inflow of desired gas (in our case $N_2$) into port (3) was 1 L/sec, coming from a standard gas cylinder. The pressure amplitude $\Delta P$ was measured at the closed end of pipe or bead filled container and varied between 0.02 and 0.06 ata. The concentration of the unwanted gas was also monitored at the closed end of the containers by removing and analyzing repeatedly small gas samples (about 1 ml).

Two steps had to be taken before the actual experiment. First, the stroke volume of the pump was adjusted in order to generate the required pressure variations in the pump assembly and in the container. This somewhat tedious trial and error process was needed since the resulting $\Delta P$ is not numerically predictable because of frequency-dependent "losses" in the outflow pipe. Measurements confirmed that the pressure amplitude was the same in the pump assembly and in the container. Second, the complete system was purged of the undesirable gas ($O_2$) using a small opening at the closed end which was immediately closed again after the purging process. The experiment was started, after these preliminary steps, by flushing the pump assembly with desired gas at a rate of 1 L/sec and starting the pump motor. The experimental conditions were set as follows: the angular velocity was varied between 12.5 and 50 rad/sec, i.e. between 120 and 480 rpm, approximately; $\Delta P$ was varied between 0.02 and 0.06 ata.

The washout was studied in empty pipes with a radius a varying between 0.19 and 2.22 cm and a length L varying between 60 and 650 cm. The bead-filled containers had a radius of 2.22 cm and varied in length between 70 and 140 cm. The beads varied in diameters between 0.25 and 1.5 cm. They were carefully stacked and held in place by the screen to keep them from moving.

The time constant T was defined as the time needed for the unwanted gas to fall to 36.8% of its value at time zero.

Figure 2:
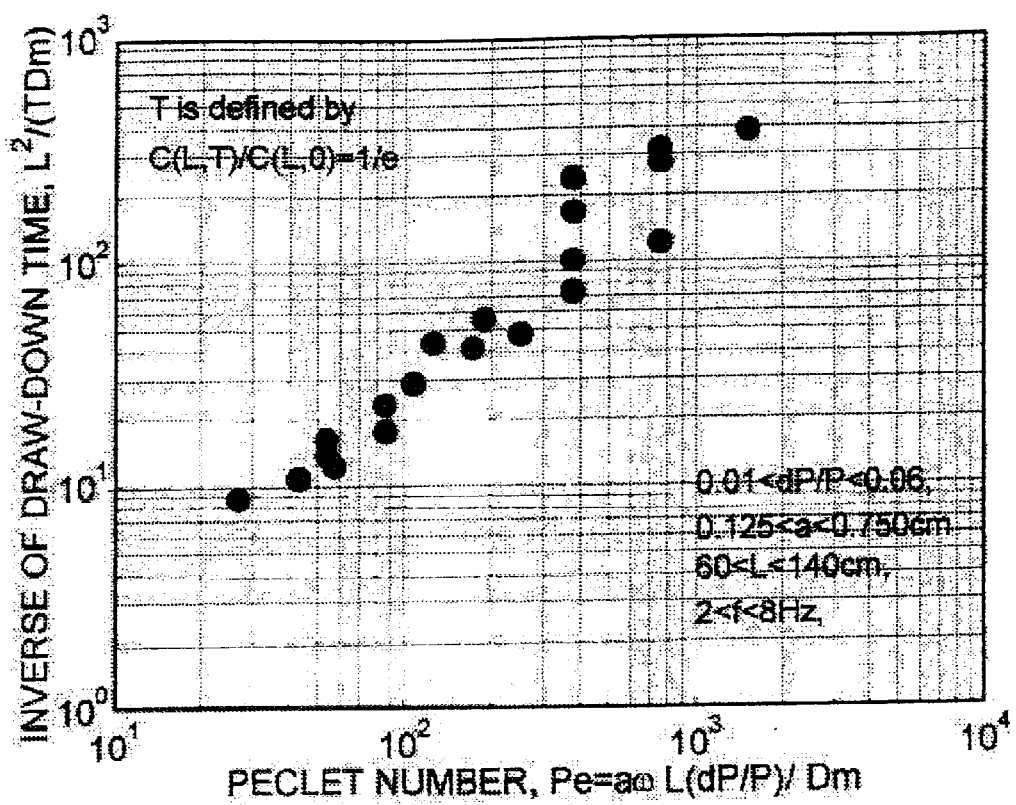
FIG. 2 shows the result of the experiment using the present invention.

The results are shown in a non-dimensional diagram FIG. 2, derived from work summarized by Bear (1972). On the abscissa is the Peclet number Pe defined as $$Pe = a\omega L\Delta P/Dm$$

where a=tube radius in empty pipes, or bead diameter in containers, in cm $\omega$=angular velocity in rad/sec L=container length or pipe length in cm $\Delta P$=pressure amplitude measured at the closed end as a fraction of ambient pressure On the ordinate is $L^2/TD_m$ where L is as before the container length or the pipe length, T is the measured time constant in minutes, and $D_m$ is the molecular diffusion coefficient of the desirable gas ($N_2$) in the unwanted gas ($O_2$) or about 0.21 cm$^2$/sec at room temperature. The graph permits one to predict the time needed for the washout of any containers filled with any kind of small solids. With knowledge of a, $\omega$, L, and $\Delta P$, one may calculate Pe and read the ordinate from FIG. 2. The ordinate leads to the time constant T.

Examples from our tests give a time constant of T=10 min for a 60 cm long container filled with beads with a diameter of 0.25 cm ($\omega$=50 rad; $\Delta P$=0.06 ata). The time constant of a cylindrical pipe with radius a=0.31 cm and L=650 cm was 15 minutes ($\omega$=50 rad/sec, $\Delta P$=0.06 ata). The time constant for the flushing of that same pipe, if open-ended, with a constant though-flow may be determined (Taylor, 1983) and compared with our results; the present invention is only 4 times slower.

APPLICATIONS

Applications include the removal of undesired gas from containers of any size filled with perishable items such as food when the food is made of small solids such as granules or flakes. The method may also apply to containers filled with solids in powder from. The method will apply to containers filled with dry, granular, explosive chemicals used in rockets, bombs, mines, and/or torpedos, which need to be purged of some unwanted gas that may react with said chemical and which typically have only one opening. The method will apply to granular material which is porous such as active coal, contained in a sealed container; it may be used to decontaminate said active coal. When granular material or powder with very small pores is to be purged of unwanted gas, large pressure swings ($\Delta P$) (1 ata or more) may be needed to accelerate the washout.

REFERENCES CITED

U.S. Patents:

U.S. Pat. No. 4,770,675. System and method for separating gases of different masses by enhanced diffusion produced by tuned oscillations. Kurzweg U H and Jaeger M J, (1988)

U.S. Pat. No. 5,288,169. Ventilation of porous media. Neeper D H, (1994)

OTHER PUBLICATIONS

Taylor G I. Dispersion of soluble matter in solvent flowing slowly through a tube. Proc. R. Soc. London A 223: 186–203, (1953)

Harris H G and Goren S L. Axial diffusion in a cylinder with pulsed flow. Chem. Eng. Sc. 22: 1571–1576, (1967)

Watson E J. Diffusion in oscillatory pipe flow. J. Fluid Mech. 133: 233–244, (1983)

Joshi C H, Kamm R D, Drazen J M, and Slutzky A S. An experimental study of gas exchange in laminar, oscillatory flow. J. Fluid Mech. 133:245–54, (1983)

Jaeger M J and Kurzweg U H. Determination of the longitudinal dispersion coefficient in flows subjected to high frequency oscillations, Phys. Fluids 26: 1380–1382, (1983)

Kurzweg U H and Jaeger M J. Diffusional separation of gases by sinusoidal oscillations. Phys. Fluids 30:1023–1025 (1986)

Jaeger M J. Diffusion and dispersion in steady counterflow: a method for the separation of gases using enhanced mass transport in oscillatory flow. Chem. Eng. Sc. 53: 3613–3621, (1998)

Leva, Max, Fluidization. McGraw Hill, NYC (1959), pp.48–49,54

Bear J. Dynamics of fluids in porous media. Dover Publications (1988), NYC (reprinted from an earlier publication in 1972), p.607

Hall K R, Smith G M, and Turcke D J. Comparison of oscillatory and stationary flow through porous media. Coastal Eng. 24:217–232, (1995)

Jaeger M J and Otis A B. J. appl. Physiol. 19:83–91 (1964)

I claim:

1. A method for mixing and purging an unwanted gas in a closed container, the closed container is filled with solids and has only a single opening, the method consists the steps of:

a) providing a reciprocating pump assembly, said pump assembly consisting of a cylinder, a piston adapted to move within said cylinder in a reciprocating motion consisting of a expulsion stroke and an uptake stroke, and an adapter, said pump assembly having a built inflow port and a built outflow port;

b) connecting the pump assembly to the single opening of the closed container by way of the adapter providing an air tight fit;

c) connecting the built outflow port to a suitably long pipe to prevent ambient gas to enter the pump assembly by way of the built outflow port;

d) supplying a continuous inflow of a desired gas to said built inflow port at an adequate flow rate;

e) flushing the pump assembly with said desired gas by using the continuous inflow of the desired gas through the built inflow port and allowing said desired gas to escape from the pump assembly through the built outflow port;

f) applying the expulsion stroke; said expulsion stroke having a stroke volume that forces and feeds a volume of the desirable gas contained in the pump assembly through the single opening and into a void space of the closed container where the desired gas is mixed with the unwanted gas, said volume of the desired gas corresponding to said stroke volume of the pump assembly and being sized in proportion to the size of the void space;

g) applying the uptake stroke and removing a volume of a mixture of unwanted gas and desired gas from the closed container through the single opening, the volume of the mixture corresponding to the stroke volume of the pump assembly;

h) allowing the volume of the mixture of unwanted gas and desired gas to be mixed in the pump assembly with the continuously in-flowing of the desired gas from the built inflow port and to exit through the built outflow port; and i) repeating steps f) through h) until all of the unwanted gas is expelled.

* * * * *